(12) United States Patent
Yin et al.

(10) Patent No.: US 12,455,843 B2
(45) Date of Patent: Oct. 28, 2025

(54) DATA PROCESSING SYSTEM AND METHOD

(71) Applicant: Huawei Technologies Co., Ltd., Shenzhen (CN)

(72) Inventors: Wen Yin, Shenzhen (CN); Wei Li, Shenzhen (CN); Yigang Zhou, Shanghai (CN); Manbo Wu, Shenzhen (CN); Xianzhou Lin, Hangzhou (CN); Chuanwei Wen, Dongguan (CN); Ruonan Wang, Shenzhen (CN); Yining Li, Shenzhen (CN)

(73) Assignee: HUAWEI TECHNOLGOIES CO., LTD., Shenzhen (CN)

( * ) Notice: Subject to any disclaimer, the term of this patent is extended or adjusted under 35 U.S.C. 154(b) by 0 days.

(21) Appl. No.: 18/744,042

(22) Filed: Jun. 14, 2024

(65) Prior Publication Data

US 2024/0338328 A1 Oct. 10, 2024

Related U.S. Application Data

(63) Continuation of application No. PCT/CN2022/136906, filed on Dec. 6, 2022.

(30) Foreign Application Priority Data

Dec. 17, 2021 (CN) .......................... 202111550014.7
Mar. 9, 2022 (CN) .......................... 202210223791.9

(51) Int. Cl.
*G06F 13/16* (2006.01)
*G06F 13/18* (2006.01)
*G06F 13/40* (2006.01)
*G06F 13/42* (2006.01)

(52) U.S. Cl.
CPC .......... *G06F 13/1668* (2013.01); *G06F 13/18* (2013.01); *G06F 13/409* (2013.01); *G06F 13/4243* (2013.01)

(58) Field of Classification Search
None
See application file for complete search history.

(56) References Cited

U.S. PATENT DOCUMENTS

| 5,339,206 | A | * | 8/1994 | Takahashi | G11B 5/5547 360/78.12 |
| 11,258,533 | B2 | * | 2/2022 | Jia | H04L 1/0004 |
| 2013/0282945 | A1 | | 10/2013 | Kelly et al. | |
| 2015/0117435 | A1 | * | 4/2015 | Baldemair | H04W 56/001 |
| 2017/0046102 | A1 | | 2/2017 | He et al. | |

(Continued)

FOREIGN PATENT DOCUMENTS

CN 1117680 A 2/1996
CN 201629845 U 11/2010

(Continued)

*Primary Examiner* — Michael Sun
(74) *Attorney, Agent, or Firm* — Conley Rose, P.C.

(57) ABSTRACT

A data processing system includes a computing subsystem and a memory subsystem. In the computing subsystem, a processor is connected to one end of a high-speed parallel bus via a first bus interface. The processor transmits data to the memory subsystem and receives data transmitted through the high-speed parallel bus. The memory subsystem receives and transmits data to the computing subsystem through the high-speed parallel bus.

20 Claims, 8 Drawing Sheets

(56) References Cited

U.S. PATENT DOCUMENTS

2020/0293467 A1* 9/2020 Ma ..................... G06F 13/4291
2021/0111829 A1* 4/2021 Jia .......................... H04L 1/001

FOREIGN PATENT DOCUMENTS

| CN | 105912493 A | 8/2016 |
|----|-------------|---------|
| CN | 205812042 U | 12/2016 |
| CN | 106980513 A | 7/2017 |

* cited by examiner

DATA PROCESSING SYSTEM AND METHOD

CROSS-REFERENCE TO RELATED APPLICATIONS

This is a continuation of International Patent Application No. PCT/CN2022/136906 filed on Dec. 6, 2022, which claims priority to Chinese Patent Application No. 202210223791.9 filed on Mar. 9, 2022 and Chinese Patent Application No. 202111550014.7 filed on Dec. 17, 2021. All of the aforementioned patent applications are hereby incorporated by reference in their entireties.

TECHNICAL FIELD

This disclosure relates to the field of communication technologies, and in particular, to a data processing system and method.

BACKGROUND

With rapid development of computer technologies, performance of a processor is improved year by year, and an operation speed is increasingly high. In this way, a storage (usually a memory) connected to the processor needs to match the performance of the processor, and the storage needs to have a high data access speed and high bandwidth. However, a speed at which the bandwidth of the storage is increased still cannot catch up with a speed at which the performance of the processor is improved.

SUMMARY

This disclosure provides a data processing system and method, to improve efficiency of transmission between a memory and a processor.

According to a first aspect, an embodiment of this disclosure provides a data processing system. The data processing system includes a computing subsystem and a memory subsystem. The computing subsystem is mainly configured to perform a data operation, and the memory subsystem is configured to store a system. The computing subsystem and the memory subsystem are connected through a high-speed parallel bus, and data transmission may be implemented between the computing subsystem and the memory subsystem through the high-speed parallel bus.

The computing subsystem includes a processor and a first bus interface. The processor may be connected to one end of the high-speed parallel bus via the first bus interface. In this way, the processor may transmit, via the first bus interface to the memory subsystem through the high-speed parallel bus, data that needs to be sent, and may further receive, via the first bus interface, data transmitted through the high-speed parallel bus (where the data may be data sent by the memory subsystem).

For example, the computing subsystem may send a data access command to the memory subsystem via the first bus interface. After modulating the data access command through higher-order modulation, the first bus interface may send the data access command. The computing subsystem may further receive, via the first bus interface, data sent by the memory subsystem. After receiving the data, the first bus interface may demodulate the data through higher-order modulation.

The memory subsystem includes a second bus interface and a memory module, and the other end of the high-speed parallel bus is connected to the second bus interface. In this way, the memory subsystem may receive, via the second bus interface, data transmitted through the high-speed parallel bus; and may further transmit, via the second bus interface to the computing subsystem through the high-speed parallel bus, data that needs to be sent.

For example, the memory subsystem may receive the data access command via the second bus interface, and access data in the memory module according to the data access command. After receiving the data access command and before accessing the data in the memory module according to the data access command, the second bus interface may demodulate the received data access command through higher-order modulation. The memory subsystem may further send data to the computing subsystem via the second bus interface, where the second bus interface may send the data after modulating the to-be-sent data through higher-order modulation.

A quantity of computing subsystems and a quantity of memory subsystems are not limited in this embodiment of this disclosure. In this embodiment of this disclosure, a system including one computing subsystem and one memory subsystem may be referred to as one subsystem, and the data processing system may include one or more subsystems. Memory subsystems in one subsystem may be connected to each other through a bus (for example, a high-speed parallel bus). In this way, a computing subsystem of one subsystem may perform data transmission with a memory subsystem of another subsystem through a high-speed parallel bus in the subsystem and a bus between memory subsystems.

According to the foregoing system, the computing subsystem and the memory subsystem are connected through the high-speed parallel bus. In comparison with another bus, a data transmission rate of the high-speed parallel bus is higher, and the bus interfaces (the first bus interface and the second bus interface) at the two ends of the high-speed parallel bus can implement higher-order modulation, so that a larger amount of data can be transmitted in a signal transmission periodicity, and high-speed data transmission can be performed between the computing subsystem and the memory subsystem, so as to improve efficiency of data transmission between the computing subsystem and the memory subsystem.

In a possible implementation, the memory module in the memory subsystem may include one type of memory module, or may include a plurality of types of memory modules. When the memory subsystem includes one type of memory module, the memory module may be directly connected to the second bus interface, and the memory module may directly perform data transmission with the computing subsystem. When the memory subsystem includes a plurality of types of memory modules, the memory subsystem further includes a plurality of hierarchical memory controllers, one of the hierarchical memory controllers is connected to one type of memory module, and the hierarchical memory controller is connected to the high-speed parallel bus via the second bus interface.

The hierarchical memory controller may receive the data access command via the second bus interface, access the data in the memory module according to the data access command, and may further send, to the computing subsystem via the second bus interface, the data obtained from the memory module.

According to the foregoing system, the composition of the memory subsystem is flexible, and is applicable to different scenarios. A plurality of types of memory modules are allowed in the memory subsystem, and storage space of the memory subsystem can be effectively expanded.

In a possible implementation, the first bus interface includes a plurality of signal pin groups, a ratio of a quantity of pins for ground signal transmission to a quantity of pins for data transmission in each signal pin group is greater than 1 and less than 2, and the data includes a data signal, a control signal, and a clock signal. The data signal is a signal that carries data plane data (for example, read data or data that needs to be written), and the control signal is a signal that carries control plane data (for example, an address of the read data or an address of the data that needs to be written).

According to the foregoing system, the ratio of the quantity of pins for ground signal transmission to the quantity of pins for data transmission of the first bus interface is within a specific range. Through experiment simulation, crosstalk of signals within the specific range is small, and a data transmission rate is high.

In a possible implementation, a ratio of the quantity of pins for data transmission to the quantity of pins for ground signal transmission in each signal pin group is 3:5, and the ratio may alternatively be a value that slightly fluctuates compared with 3:5.

According to the foregoing system, under this ratio, the first bus interface has a stronger anti-interference capability and a higher data transmission rate.

In a possible implementation, pins in each signal pin group are arranged in an array. The array herein refers to a manner in which the pins are arranged in rows and columns, and the signal pin group may satisfy a part or all of the following conditions:

Condition 1: Pins in adjacent rows are not aligned (or pins in adjacent columns are not aligned).

Condition 2: Pins in a plurality of spaced rows are aligned, where the plurality of spaced rows is a plurality of rows spaced at an interval of one row in the array (or pins in a plurality of spaced columns are aligned, where the plurality of spaced columns are a plurality of columns spaced at an interval of one column in the array).

Condition 3: A perpendicular line from any pin in any row to an adjacent row coincides with a midperpendicular line of two adjacent pins in the adjacent row.

Condition 4: Any pin in any row and two adjacent pins form an equilateral triangle, where the two adjacent pins are located in a same row.

According to the foregoing system, the arrangement manner of the pins in each signal pin group is not a rectangular square array from another approach, but presents a specific arrangement rule. According to the arrangement rule, the first bus interface can implement high-speed data transmission.

In a possible implementation, a quantity of pins in each signal pin group is not limited in this disclosure. Each signal pin group includes 32 pins, and the first bus interface includes a large quantity of pins to transmit a large amount of data, to ensure transmission efficiency of the first bus interface.

In a possible implementation, a quantity of pins in each signal pin group is not limited in this disclosure. For example, each signal pin group includes eight pins for data signal transmission, two pins for control signal transmission, two pins for clock signal transmission, and 20 pins for ground signal transmission. Different types of pins may also be increased proportionally based on the foregoing quantity. In some scenarios, the quantity of pins for ground signal transmission is allowed to be reduced.

According to the foregoing system, each signal pin group includes specific quantities of pins of different types, and the quantities of pins are also regular, to ensure performance of the first bus interface.

In a possible implementation, a quantity of signal pin groups in the first bus interface is not limited in this disclosure, and the quantity of signal pin groups matches bandwidth of the first bus interface. For example, the first bus interface may include eight signal pin groups. In this way, it can be ensured that the first bus interface is applicable to transmission scenarios with different bandwidth requirements.

In a possible implementation, the computing subsystem further includes a clock circuit, the clock circuit is configured to provide a clock signal for the first bus interface, the clock circuit includes an inductor and a signal source, and the inductor and the signal source are in a T-shaped structure.

According to the foregoing system, the inductor and the signal source are in the T-shaped structure, so that an area of the clock circuit can be effectively reduced, and deployment of the clock circuit is facilitated.

In a possible implementation, the clock circuit is connected to the first bus interface through a frequency adjustment circuit, the frequency adjustment circuit is configured to increase a frequency of the clock signal, and the first bus interface performs higher-order modulation based on the clock signal whose frequency is increased. A specific type of the frequency adjustment circuit is not limited in this embodiment of this disclosure. Any circuit that can increase the frequency of the clock signal is applicable to this embodiment of this disclosure.

According to the foregoing system, the clock signal generated by the clock circuit can be transmitted to the pin of the first bus interface, and the frequency of the clock signal can further be increased, so that the first bus interface performs higher-order modulation based on the clock signal whose frequency is increased. In this way, the first bus interface does not need to be connected to another circuit to obtain a high-frequency clock signal, and the clock signal can be effectively used.

According to a second aspect, an embodiment of this disclosure provides a data processing method. The method is applied to a data processing system. The data processing system includes a computing subsystem and a memory subsystem. The computing subsystem and the memory subsystem are connected through a high-speed parallel bus. The computing subsystem includes a processor and a first bus interface. The processor is connected to one end of the high-speed parallel bus via the first bus interface. The memory subsystem includes a second bus interface and a memory module, and the other end of the high-speed parallel bus is connected to the second bus interface. For beneficial effects, refer to related descriptions of the first aspect. Details are not described herein again. In the method, the processor may send a data access command to the memory subsystem via the first bus interface, where the first bus interface sends the data access command after modulating the data access command through higher-order modulation. The memory subsystem may receive the data access command via the second bus interface, and access data in the memory module according to the data access command. After receiving the data access command, the second bus interface demodulates the data access command through higher-order modulation.

In a possible implementation, the memory subsystem may send data to the computing subsystem via the second bus interface, where the first bus interface sends the data after modulating the data through higher-order modulation. The processor may receive the data via the first bus interface, where the first bus interface demodulates the data through higher-order modulation after receiving the data.

In a possible implementation, the memory subsystem includes a plurality of types of memory modules, and the memory subsystem further includes a plurality of hierarchical memory controllers. One of the hierarchical memory controllers is connected to one type of memory module. The hierarchical memory controller is connected to the high-speed parallel bus via the second bus interface. When the memory subsystem receives the data access command via the second bus interface, the hierarchical memory controller may receive the data access command via the second bus interface, and access data in the memory module according to the data access command.

In a possible implementation, the memory subsystem includes a plurality of types of memory modules, and the memory subsystem further includes a plurality of hierarchical memory controllers. One of the hierarchical memory controllers is connected to one type of memory module. The hierarchical memory controller is connected to the high-speed parallel bus via the second bus interface. When the memory subsystem sends data to the computing subsystem via the second bus interface, the hierarchical memory controller may send the data to the computing subsystem via the second bus interface.

In a possible implementation, the first bus interface includes a plurality of signal pin groups, a ratio of a quantity of pins for ground signal transmission to a quantity of pins for data transmission in each signal pin group is greater than 1 and less than 2, and the data includes a data signal, a control signal, and a clock signal.

In a possible implementation, a ratio of the quantity of pins for data transmission to the quantity of pins for ground signal transmission in each signal pin group is 3:5.

According to a third aspect, an embodiment of this disclosure further provides a computing device. The computing device includes the data processing system according to the first aspect.

According to a fourth aspect, this disclosure further provides a computer-readable storage medium. The computer-readable storage medium stores instructions. When the instructions are run on a computer, the computer is enabled to perform the method according to the second aspect and the possible implementations of the second aspect.

According to a fifth aspect, this disclosure further provides a computer program product including instructions. When the instructions are run on a computer, the computer is enabled to perform the method according to the second aspect and the possible implementations of the second aspect.

According to a sixth aspect, this disclosure further provides a computer chip. The chip is connected to a memory, and the chip is configured to read and execute a software program stored in the memory, to perform the method according to the second aspect and the possible implementations of the second aspect.

DESCRIPTION OF EMBODIMENTS

Figure 1:
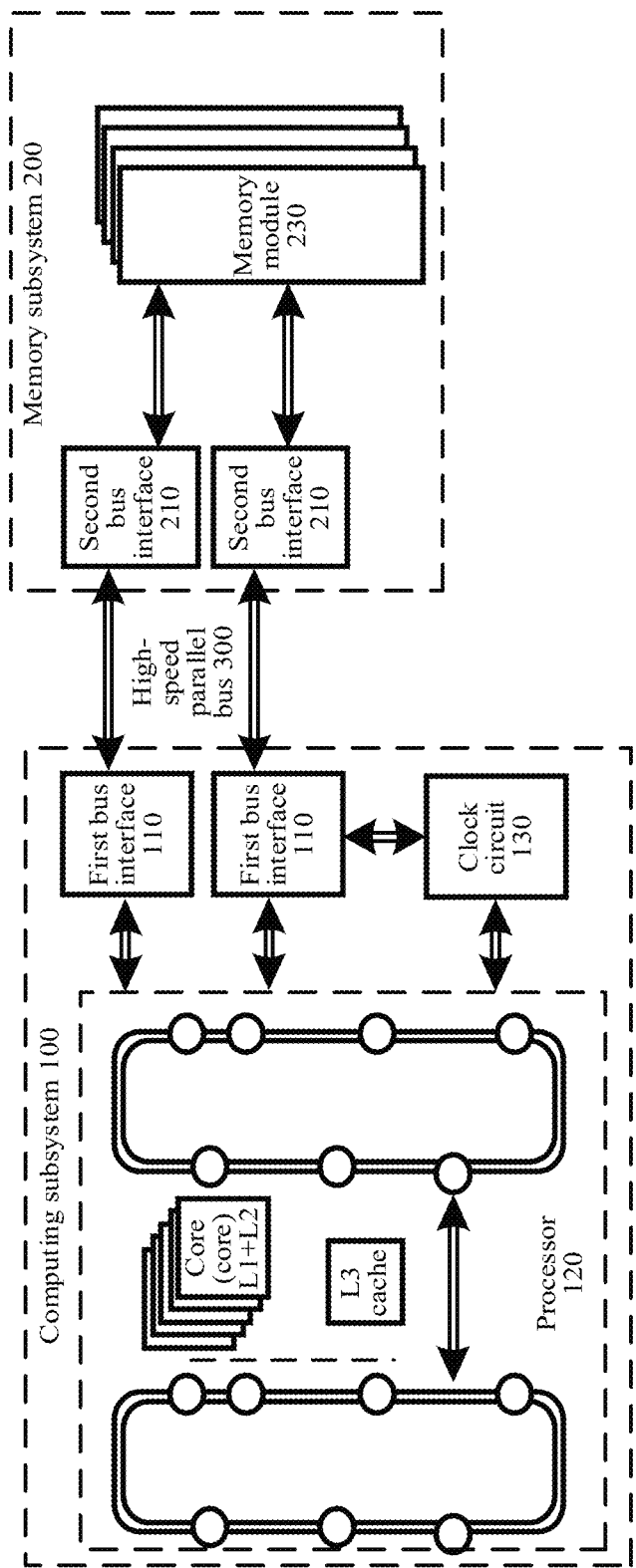
FIG. 1 is a schematic diagram of an architecture of a data processing system according to this disclosure.

As shown in FIG. 1, an embodiment of this disclosure provides a data processing system. The data processing system includes a computing subsystem 100 and a memory subsystem 200. The computing subsystem 100 and the memory subsystem 200 are connected through a high-speed parallel bus 300. The data processing system may be located in a device such as a server or a mobile terminal.

The computing subsystem 100 is mainly configured to implement an operation. The memory subsystem 200 is configured to buffer data. The computing subsystem 100 may read data from the memory subsystem 200, and perform an operation by using the read data. The computing subsystem 100 may also write data obtained after the operation into the memory subsystem 200.

Data needs to be exchanged between the computing subsystem 100 and the memory subsystem 200. In this embodiment of this disclosure, to ensure that data can be efficiently exchanged between the computing subsystem 100 and the memory subsystem 200, and enable the computing subsystem 100 to perform better computing performance, in this embodiment of this disclosure, the computing subsystem 100 is connected to the memory subsystem 200 through the high-speed parallel bus 300. The high-speed parallel bus 300 can ensure that a large amount of data can be exchanged between the computing subsystem 100 and the memory subsystem 200 within short duration, so that a read/write speed of the memory subsystem 200 can match a computing capability of the computing subsystem 100.

In this embodiment of this disclosure, in addition to disposing the high-speed parallel bus 300 between the computing subsystem 100 and the memory subsystem 200, to match the high-speed parallel bus 300, corresponding bus interfaces are further disposed in the computing subsystem 100 and the memory subsystem 200, so as to ensure that data that needs to be exchanged between the computing subsystem 100 and the memory subsystem 200 can be transmitted through the high-speed parallel bus 300 after being processed through the bus interfaces. To conveniently distinguish between the bus interfaces disposed in the computing subsystem 100 and the memory subsystem 200, the bus interface in the computing subsystem 100 is referred to as a first bus interface 110, and the bus interface in the memory subsystem 200 is referred to as a second bus interface 210.

The following describes structures of the computing subsystem 100 and the memory subsystem 200.

The computing subsystem 100 includes a processor 120, a clock circuit 130, and the first bus interface 110. The processor 120 may include one or more cores, and may further include a cache, such as an L1 cache, an L2 cache, and an L3 cache. Data may be transmitted between the cores of the processor 120 through a bus inside the processor. The processor 120 is connected to the first bus interface 110, and the clock circuit 130 is connected to the first bus interface 110. The clock circuit 130 is configured to generate a clock signal. The clock signal generated by the clock circuit 130 may be transmitted to the first bus interface 110, and is transmitted to a high-speed serial bus via the first bus interface 110. The processor 120 is connected to the high-speed serial bus via the first bus interface 110. The processor 120 may interact with the memory subsystem 200 via the first bus interface 110. For example, a data access command generated by the processor 120 may be sent, via the first bus interface 110, to the memory subsystem 200 through the high-speed serial bus. The processor 120 may also receive, via the first bus interface 110, a data access response that is from the memory subsystem 200 and that is transmitted through the high-speed serial bus. The data access command includes a data read command used to request to read data and a data write command used to request to write data. A data access response fed back for the data read command may carry data read from the memory subsystem 200, and a data access response fed back for the data write command may indicate that data writing succeeds or fails.

The memory subsystem 200 includes the second bus interface 210 and a memory module 230. In the memory subsystem 200, the second bus interface 210 is connected to the high-speed serial bus. The memory module 230 is a module that is in the memory subsystem 200 and that is configured to store data. A type of the memory module 230 is not limited in embodiments of this disclosure. For example, the memory module 230 may be a double data rate synchronous dynamic random-access memory (DDR SDRAM), a storage-class memory (SCM), a synchronous dynamic random-access memory (SDRAM), or the like.

In the memory subsystem 200 shown in FIG. 1, the memory module 230 is directly connected to the high-speed serial bus via the second bus interface 210. In this way, the memory module 230 may receive the data access command from the processor 120 via the second bus interface 210, and the memory module 230 may access, according to the data access command, the data stored in the memory module 230. Alternatively, the memory module 230 may send, via the second bus interface 210 to the processor 120 through the high-speed serial bus, data that needs to be sent to the processor.

The memory subsystem 200 shown in FIG. 1 is applicable to a case in which the memory subsystem 200 includes one type of memory module 230. In this way, the memory module 230 may be connected to the high-speed parallel bus 300 via the same second bus interface 210.

A connection manner between the computing subsystem 100 and the memory subsystem 200 provided in this embodiment of this disclosure is also applicable to a case in which the memory subsystem 200 includes a plurality of different types of memory modules 230.

Figure 2:
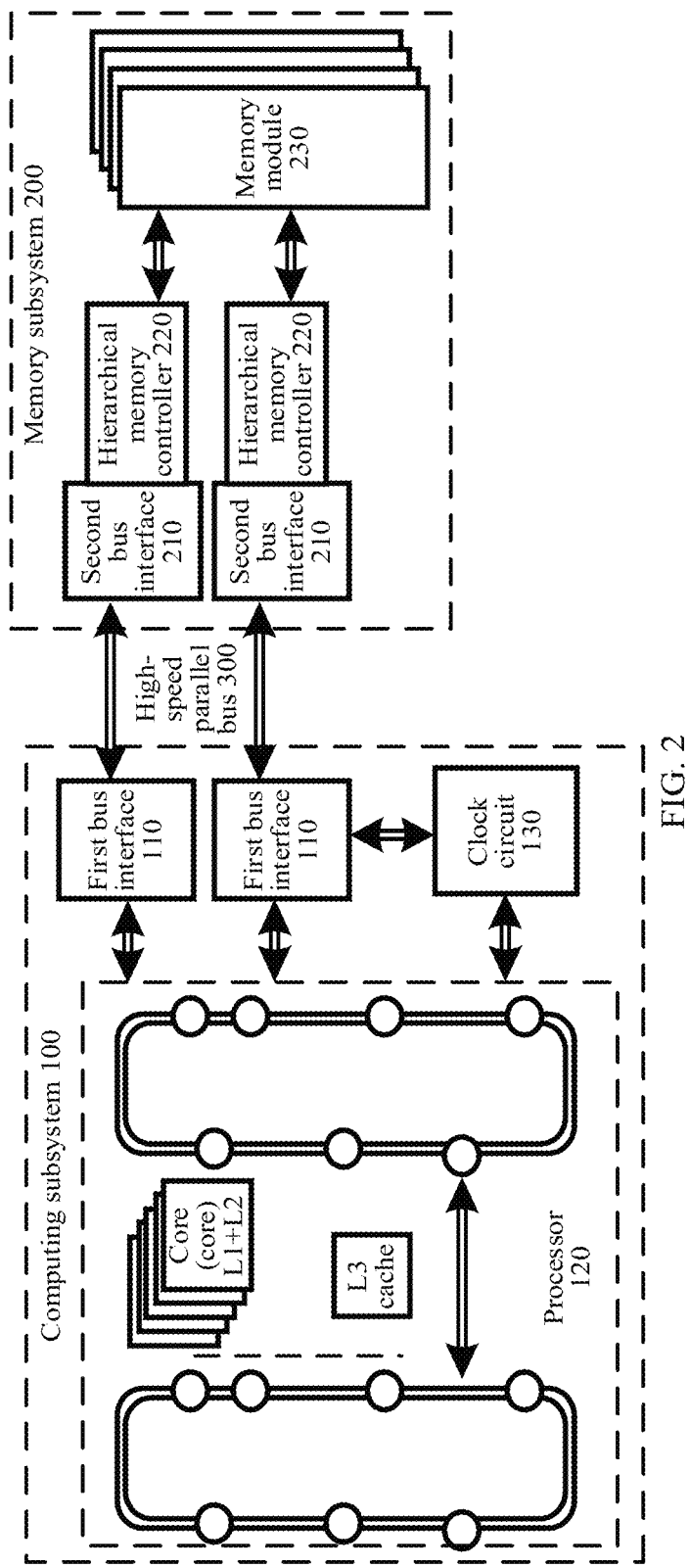
FIG. 2 is a schematic diagram of an architecture of a data processing system according to this disclosure.

FIG. 2 shows a data processing system according to an embodiment of this disclosure. The data processing system includes a computing subsystem 100 and a memory subsystem 200. The computing subsystem 100 and the memory subsystem 200 are connected through a high-speed parallel bus 300.

For descriptions of the computing subsystem 100, refer to the foregoing content, and details are not described herein again.

The memory subsystem 200 includes a hierarchical memory controller 220, a second bus interface 210, and a memory module 230. In FIG. 2, in the memory subsystem 200, the hierarchical memory controller 220 is connected to a high-speed serial bus via the second bus interface 210, and the hierarchical memory controller 220 is connected to the memory module 230. A quantity of hierarchical memory controllers 220 is not limited in this embodiment of this disclosure. For example, the memory subsystem 200 may include a plurality of hierarchical memory controllers 220, and one hierarchical memory controller 220 may be connected to one type of memory module 230. For another example, the memory subsystem 200 may include one hierarchical memory controller 220, and the hierarchical memory controller 220 may be connected to different types of memory modules 230. For example, slots or interfaces that match the different types of memory modules 230 may be configured on the hierarchical memory controller 220, so that the different memory modules 230 may be connected to the hierarchical memory controller 220 through the corresponding slots or interfaces.

In the data processing system shown in FIG. 2, the hierarchical memory controller 220 may receive a data access command from the processor 120 via the second bus interface 210. After receiving the data access command, the hierarchical memory controller 220 parses the data access command, and accesses, according to the data access command, data stored in the memory module 230. The hierarchical memory controller 220 may alternatively obtain data from the memory module 230, and send the obtained data to the processor 120 via the second bus interface 210 through the high-speed serial bus.

In addition, the data processing system may include a plurality of subsystems, and each subsystem includes one computing subsystem 100 and one memory subsystem 200. Structures of the computing subsystem 100 and the memory subsystem 200 may be the same as the structures of the computing subsystem 100 and the memory subsystem 200 shown in FIG. 1 or FIG. 2.

All the subsystems are connected to each other. Any subsystem may interact with a memory subsystem 200 in a subsystem connected to the subsystem, and access data in the memory subsystem 200 in the subsystem connected to the subsystem.

The following uses an example in which the data processing system includes two subsystems as an example to describe a connection manner between the subsystems when the data processing system includes the plurality of subsystems. Descriptions herein focus on only the connection manner between the subsystems. For functions of the computing subsystem 100 and the memory subsystem 200 in the subsystems, functions of the components (such as the first bus interface 110, the processor 120, and the clock circuit 130) in the computing subsystem 100, and functions of the components (such as the second bus interface 210, the memory module 230, and the hierarchical memory controller 220) in the memory subsystem 200, refer to the foregoing descriptions, and details are not described herein again.

Figure 3:
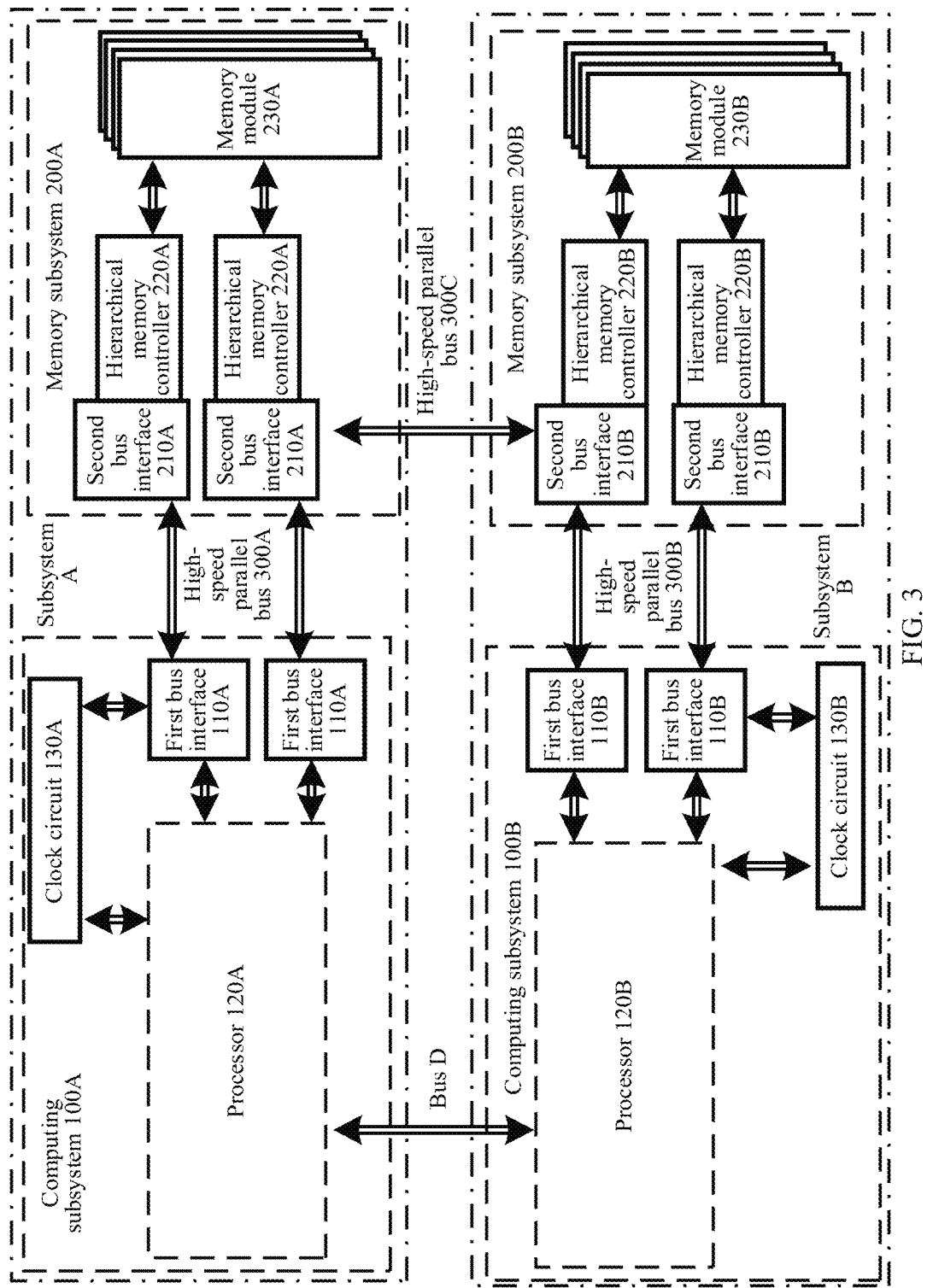
FIG. 3 is a schematic diagram of an architecture of a data processing system according to this disclosure.

As shown in FIG. 3, a data processing system includes a subsystem A and a subsystem B, and the subsystem A includes a computing subsystem 100A and a memory subsystem 200A. The computing subsystem 100A and the memory subsystem 200A are connected through a high-speed parallel bus 300A. The computing subsystem 100A includes a processor 120A, a clock circuit 130A, and a first bus interface 110A. The clock circuit 130A is connected to the first bus interface 110A, and the processor 120A is connected to the first bus interface 110A. The memory subsystem 200A includes a hierarchical memory controller 220A, a second bus interface 210A, and a memory module 230A. In the memory subsystem 200A, the hierarchical memory controller 220A is connected to a high-speed serial bus via the second bus interface 210A, and the hierarchical memory controller 220A is connected to the memory module 230A.

An internal structure of the subsystem B is similar to that of the subsystem A. To facilitate distinguishing, components of the subsystem B are marked with B.

The memory subsystem 200A in the subsystem A is connected to a memory subsystem 200B in the subsystem B through a high-speed parallel bus 300C. A manner in which the high-speed parallel bus 300C connects the memory subsystem 200A and the memory subsystem 200B is not limited in embodiments of this disclosure. For example, the second bus interface 210A in the memory subsystem 200A may be connected to a second bus interface 210B in the memory subsystem 200B through the high-speed parallel bus 300C.

In this way, the computing subsystem 100A in the subsystem A may interact with the memory subsystem 200B in the subsystem B, and a data access command sent by the computing subsystem 100A to the memory subsystem 200B may be transmitted to the memory subsystem 200B via the first bus interface 110A, the high-speed parallel bus 300A, the high-speed parallel bus 300C, and the second bus interface 210B. A data access response fed back by the memory subsystem 200B to the computing subsystem 100A may be transmitted to the memory subsystem 200A via the second bus interface 210B, the high-speed parallel bus 300C, the high-speed parallel bus 300A, and the first bus interface 110A.

The computing subsystem 100A in the subsystem A and a computing subsystem 100B in the subsystem B may further be connected through a bus D. In this way, the computing subsystem 100A and the computing subsystem 100B can cooperate to perform some operations. A manner in which the bus D connects the computing subsystem 100A and the computing subsystem 100B and a type of the bus D are not limited in embodiments of this disclosure.

For example, the processor 120A in the computing subsystem 100A may be connected to a processor 120B in the computing subsystem 100B through the bus D. The bus D may be a symmetrical multi-processing (SMP) bus.

It can be learned from the data processing systems shown in FIG. 1, FIG. 2, and FIG. 3 that the new high-speed parallel bus 300 is constructed between the memory subsystem 200 and the computing subsystem 100, and the corresponding bus interfaces are configured in the memory subsystem 200 and the computing subsystem 100. The following correspondingly describes the components included in the computing subsystem 100 and the high-speed parallel bus 300 provided in embodiments of this disclosure.

(1) First bus interface 110: For the first bus interface 110 and the second bus interface 210 shown in FIG. 1 and FIG. 2, structures and functions of the two interfaces are similar. Herein, the first bus interface 110 is used as an example for description.

Figure 4:
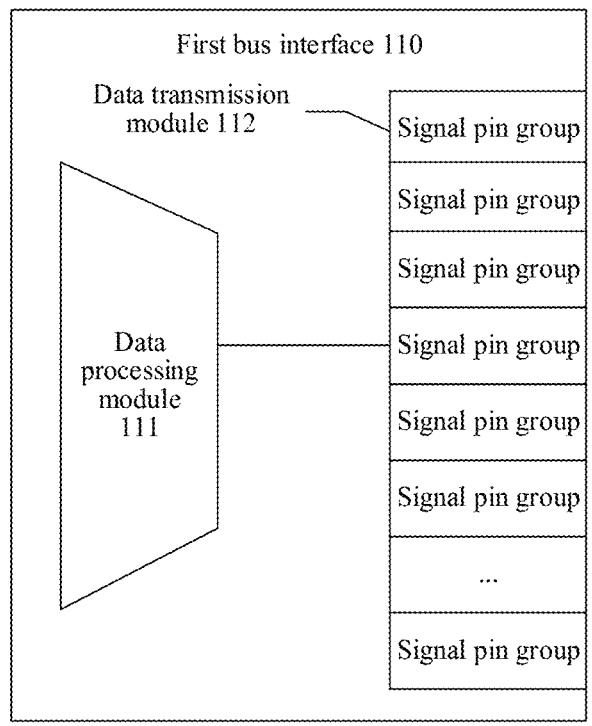
FIG. 4 is a schematic diagram of a structure of a first bus interface according to this disclosure.

FIG. 4 is a schematic diagram of a structure of the first bus interface 110 according to an embodiment of this disclosure. The first bus interface 110 includes a data processing module 111 and a data transmission module 112.

The data processing module 111 is connected to the processor 120, and may receive a data access command transmitted by the processor 120. The data processing module 111 may process the data access command and generate a signal. The data transmission module 112 may transmit the signal generated by the data processing module 111 to the high-speed parallel bus 300. The data processing module 111 is connected to the data transmission module 112. The data transmission module 112 receives a data access response from the high-speed parallel bus 300, and transmits the received data access response to the data processing module 111. The data processing module 111 may process the data access response received by the data transmission module 112, and transmit the processed data access response to the processor 120.

The processing performed by the data processing module 111 on the data access command and the data access response includes modulation and demodulation. The data processing module 111 modulates data carried in the data access command, modulates the data onto a carrier signal, and generates a signal. For a data write command used to request to write data, data carried in the data write command includes data that needs to be written into the memory subsystem 200 and an address of the data in the memory subsystem 200. The data processing module 111 modulates the data that needs to be written into the memory subsystem 200, and may generate a data signal; and modulates the address of the data in the memory subsystem 200, and may generate a control signal. For a data read command used to request to read data, data carried in the data read command includes an address of data that needs to be read from the memory subsystem 200. The data processing module 111 modulates the address of the data that needs to be read, and may generate a control signal.

The control signal generated by the data processing module 111 may be understood as a control plane signal exchanged between the processor 120 and the memory subsystem 200. The data signal is a data plane signal exchanged between the processor 120 and the memory subsystem 200.

The data processing module 111 demodulates a signal transmitted by the data transmission module 112, to obtain data carried in the signal; and transmits the obtained data to the processor 120. The signal transmitted by the data transmission module 112 includes but is not limited to a data signal carrying data or a control signal sent by the memory subsystem 200. For example, the control signal may be a response fed back by the memory subsystem 200 to the processor 120. For example, when data in the memory subsystem 200 is read, the response may indicate that the reading fails or succeeds; and when data is written into the memory subsystem 200, the response may indicate that the data writing succeeds or fails. The data carried in the data signal is data that the processor 120 needs to read from the memory subsystem 200.

In embodiments of this disclosure, the data processing module 111 implements higher-order modulation and demodulation. For example, the data processing module 111 may implement modulation and demodulation based on three-level pulse amplitude modulation (PAM3) or four-level pulse amplitude modulation (PAM4). Through higher-order modulation, signals can be transmitted by using a plurality of signal levels, and data of a plurality of bits can be transmitted in each periodicity. In comparison with lower-order modulation, more data can be transmitted in each periodicity and a transmission rate is higher for higher-order modulation.

An internal structure of the data processing module 111 is not limited in embodiments of this disclosure. Any module that can implement processing of data transmitted by the processor 120 or the memory subsystem 200 is applicable to embodiments of this disclosure.

The data transmission module 112 can transmit a signal to the high-speed parallel bus 300, and may further receive a signal from the high-speed parallel bus 300. The data transmission module 112 includes a plurality of signal pin groups. An amount of data that can be transmitted by each signal pin group in one signal transmission periodicity (where the signal transmission periodicity may be understood as a clock signal periodicity) is 1 byte, and a ratio of a quantity of pins for ground signal transmission to a quantity of pins for data transmission in each signal pin group is greater than 1 and less than 2. For example, a ratio of the quantity of pins for data transmission to the quantity of pins for ground signal transmission in each signal pin group is 3:5.

A pin for data transmission means that a signal transmitted by the pin carries some important information, such as data, an address, and a clock. For ease of description, the pin for data transmission includes a data pin, a control pin, and a clock pin. The data pin is configured to transmit a data signal. The data signal carries data that needs to be stored in the memory subsystem 200, or data required by the processor 120 for an operation (namely, data that needs to be read by the processor 120 from the memory subsystem 200). The control pin is configured to transmit a control signal. The clock pin is configured to transmit a clock signal. The clock signal is used to synchronize a frequency of a control signal or a data signal. The clock signal may be generated by the clock circuit 130 in the computing subsystem 100.

A pin for ground signal transmission may be referred to as a ground pin, and a ground signal is used to avoid crosstalk generated during signal transmission in signal pins in a signal pin group. The ground signal may be generated by a ground interface of a power module (where the power module is a module configured to supply power in a device), and the ground pin may be directly connected to the ground interface, or may be connected to the ground interface through another component.

In embodiments of this disclosure, the ratio of the quantity of pins for data transmission to the quantity of pins for ground signal transmission in each signal pin group may be maintained at 3:5. It should be noted that, in embodiments of this disclosure, the ratio of the quantity of pins for data transmission to the quantity of pins for ground signal transmission in each signal pin group is allowed to fluctuate to some extent compared with 3:5. For example, when the bus interface is designed, some ground pins may be reduced. In this way, the ratio of the quantity of pins for data transmission to the quantity of pins for ground signal transmission in the signal pin group is greater than 3:5. In other words, in embodiments of this disclosure, there is a specific difference between the ratio of the quantity of pins for data transmission to the quantity of pins for ground signal transmission in each signal pin group and 3:5, and the difference is less than a threshold.

A quantity of different types of pins in each signal pin group is not limited in embodiments of this disclosure. For example, each signal pin group includes eight data pins, two control pins, two clock pins, and 20 ground pins. In embodiments of this disclosure, a quantity of signal pin groups is not limited.

In embodiments of this disclosure, pins included in a signal pin group are arranged in a form of an array. To be specific, the pins in the signal pin group are arranged in a form of rows and columns.

The array satisfies a part or all of the following conditions:

Condition 1: Pins in adjacent rows of the array are not aligned, or pins in adjacent columns of the array are not aligned.

That pins in adjacent rows of the array are not aligned means that the pins in the adjacent rows are located in different columns, and that pins in adjacent columns of the array are not aligned means that the pins in the adjacent columns are located in different rows.

Condition 2: Pins in a plurality of spaced rows of the array are aligned, and pins in a plurality of spaced columns of the array are aligned. The plurality of spaced rows are a plurality of rows spaced at an interval of one row in the array, and the plurality of spaced columns are a plurality of columns spaced at an interval of one column in the array.

That pins in a plurality of spaced rows of the array are aligned means that pins at same sorting positions in all the spaced rows are located in a same column. For example, the second pins in all the spaced rows are located in a same column. That pins in a plurality of spaced columns of the array are aligned means that pins at same sorting positions in all the spaced columns are located in a same row. For example, the first pins in all the spaced columns are located in a same column.

Condition 3: In the array, a perpendicular line from any pin in any row to an adjacent row coincides with a midperpendicular line of two adjacent pins in the adjacent row.

Condition 4: In the array, any pin in any row and two adjacent pins form an equilateral triangle, where the two adjacent pins in the pins are located in a same row.

It is tested that when a part or all of the foregoing conditions are satisfied, signal quality of the first bus interface 110 can be improved, and signal integrity of the first bus interface 110 can be ensured. The first bus interface 110 can ensure a high signal transmission rate.

Figure 5:
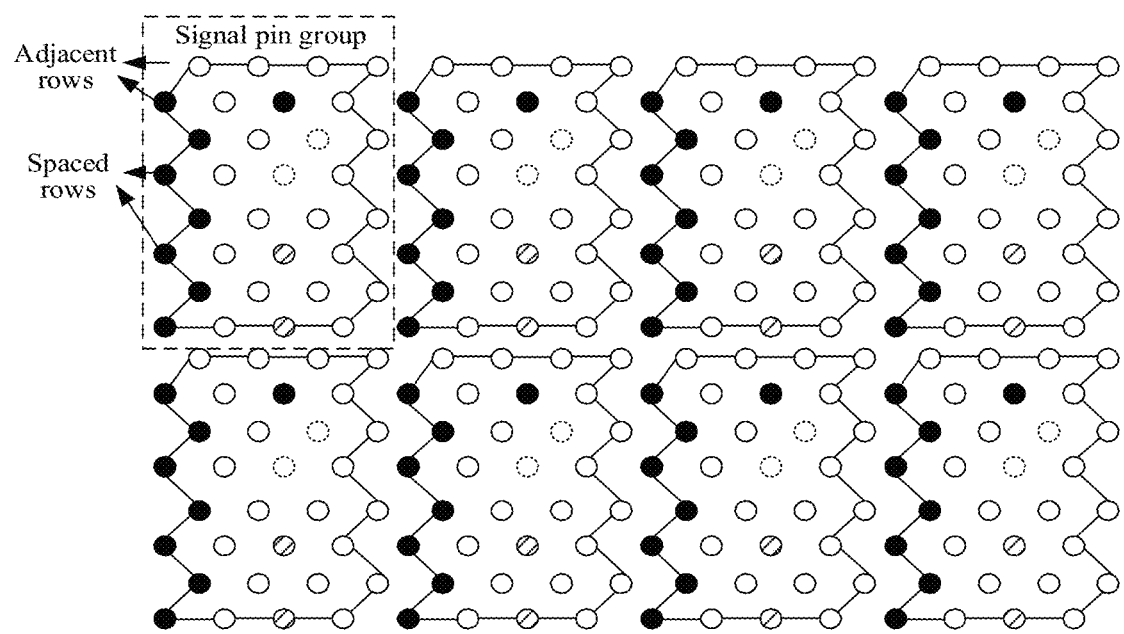
FIG. 5 is a schematic diagram of pin arrangement of a first bus interface according to this disclosure.

FIG. 5 shows an arrangement manner of pins in the data transmission module 112 according to an embodiment of this disclosure. In FIG. 5, a white circle represents a ground pin, a black circle represents a data pin, a dashed circle represents a control pin, and a texture-filled circle represents a clock pin.

In FIG. 5, one signal pin group includes 32 pins, the 32 pins are arranged in an array, the array includes eight rows of pins, and each row of pins includes four signal pins. Adjacent rows in the array are not aligned, to be specific, pins in two adjacent rows are misplaced and are not in a same column. Pins in spaced rows are aligned, to be specific, pins at same sorting positions in the spaced rows are in a same row.

Figure 6:
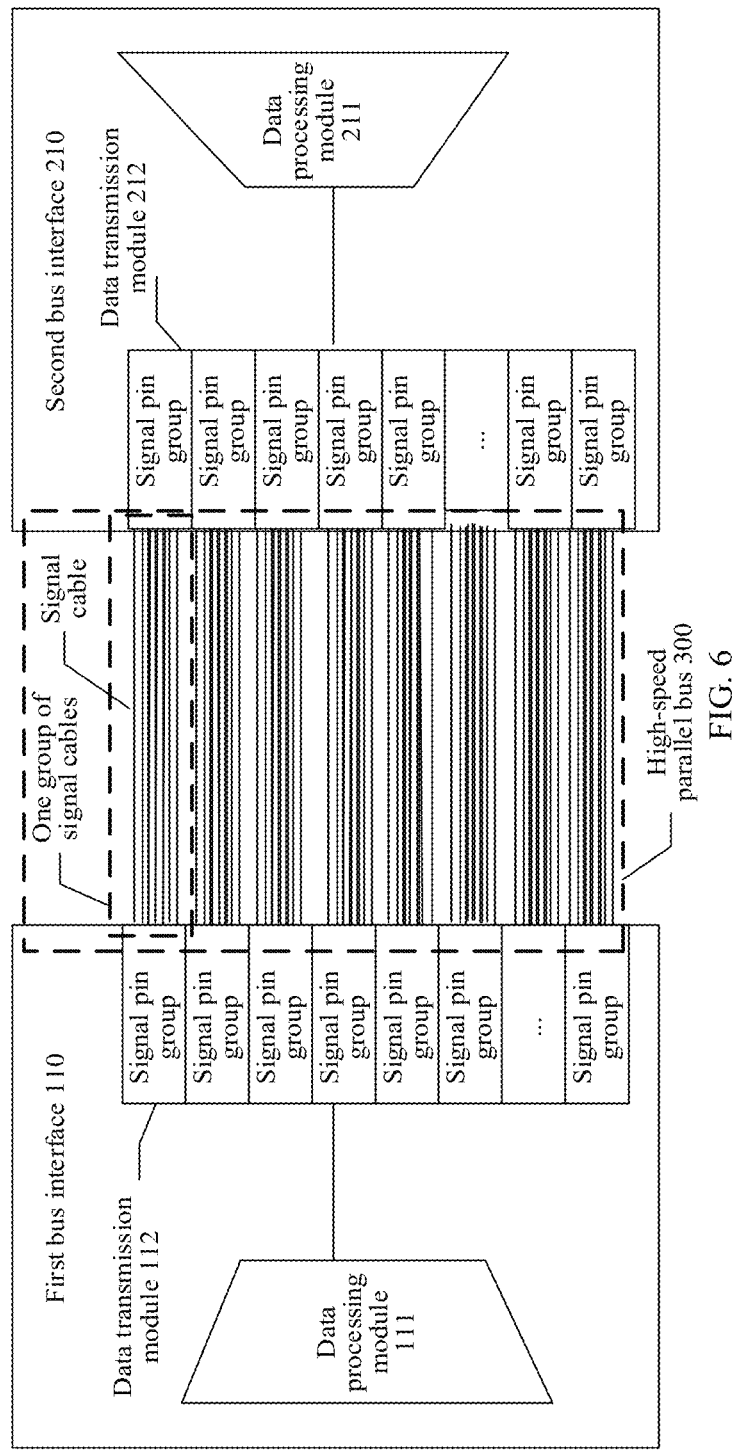
FIG. 6 is a schematic diagram of a high-speed parallel bus according to this disclosure.

(2) High-speed parallel bus 300:

FIG. 6 is a schematic diagram of the high-speed parallel bus 300 between the computing subsystem 100 and the memory subsystem 200. The high-speed parallel bus 300 includes a plurality of groups of signal cables connecting the first bus interface 110 and the second bus interface 210. Each group of signal cables is used to connect one signal pin group in the first bus interface 110 and one signal pin group in the second bus interface 210. Each group of signal cables includes a plurality of signal cables, and one signal cable is used to connect one pin in the first bus interface 110 and a pin in the second bus interface 210.

The high-speed parallel bus 300 allows the plurality of groups of signal cables to simultaneously transmit signals, so as to implement parallel signal transmission. A data transmission rate between the computing subsystem 100 and the memory subsystem 200 can be effectively improved by using the high-speed parallel bus 300.

(3) Clock circuit 130:

In FIG. 1, FIG. 2, and FIG. 3, the first bus interface 110 is connected to the clock circuit 130, and the clock circuit 130 is configured to generate a clock signal. In the computing subsystem 100, running program instructions and performing operations by the processor 120 need to comply with a clock signal. The clock signal enables the processor 120 to sequentially perform the operations. The first bus interface 110 also needs to comply with the clock signal during data sending and data reception. The first bus interface 110 can sequentially send and receive signals by using the clock signal. The clock signal may be simply considered as a pulse signal or a square wave including a rising edge and a falling edge. A shorter interval between pulse signals indicates a higher clock frequency and a higher data transmission rate.

In embodiments of this disclosure, the clock circuit 130 may use an LC architecture (where L represents an inductor, and C represents a capacitor). The clock circuit 130 is an oscillation circuit, and the clock circuit 130 includes a capacitor, an inductor, and a current source. In the clock circuit 130, a position relationship between the current source and the inductor may be in a T-shaped structure.

Figure 7:
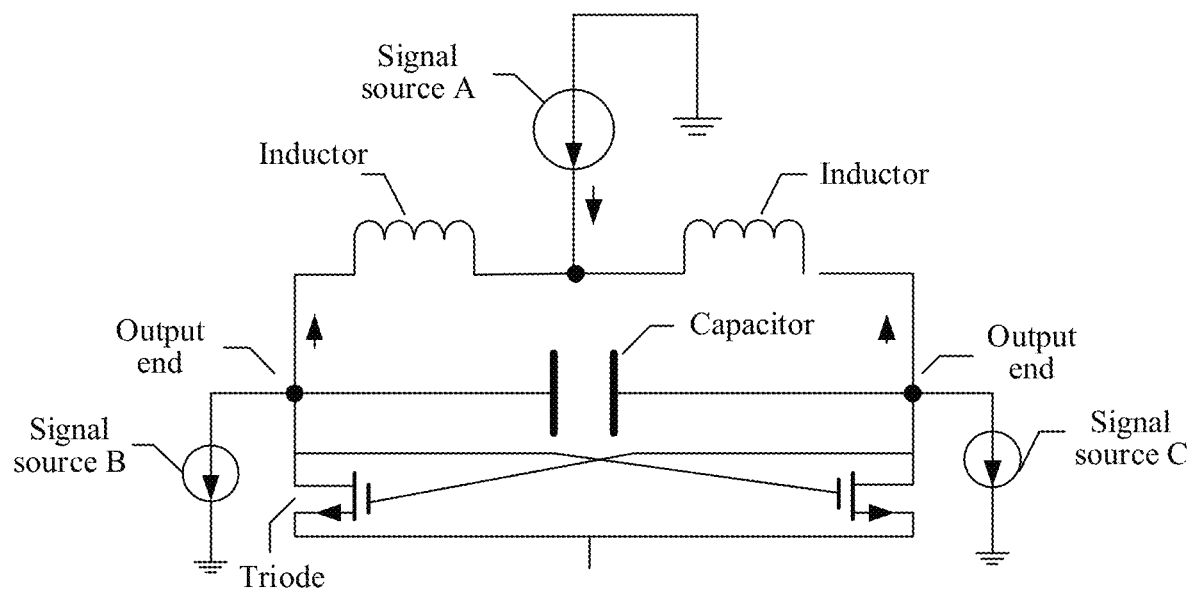
FIG. 7 is a schematic diagram of a structure of a clock circuit according to this disclosure.

There is a plurality of implementations in which the position relationship between the current source and the inductor in the clock circuit 130 is in the T-shaped structure. An implementation of the T-shaped structure is not limited in embodiments of this disclosure. FIG. 7 shows a type of clock circuit 130 according to an embodiment of this disclosure. The clock circuit includes a capacitor, inductors, three signal sources (for example, a signal source A, a signal source B, and a signal source C), and triodes. For output ends of the circuit, refer to positions identified in FIG. 7. An arrow direction in FIG. 7 represents a direction of the circuit. In the circuit diagram shown in FIG. 7, the signal source A and the two inductors are in a T-shaped structure. An area of the clock circuit 130 can be effectively reduced by using this circuit structure.

Figure 8:
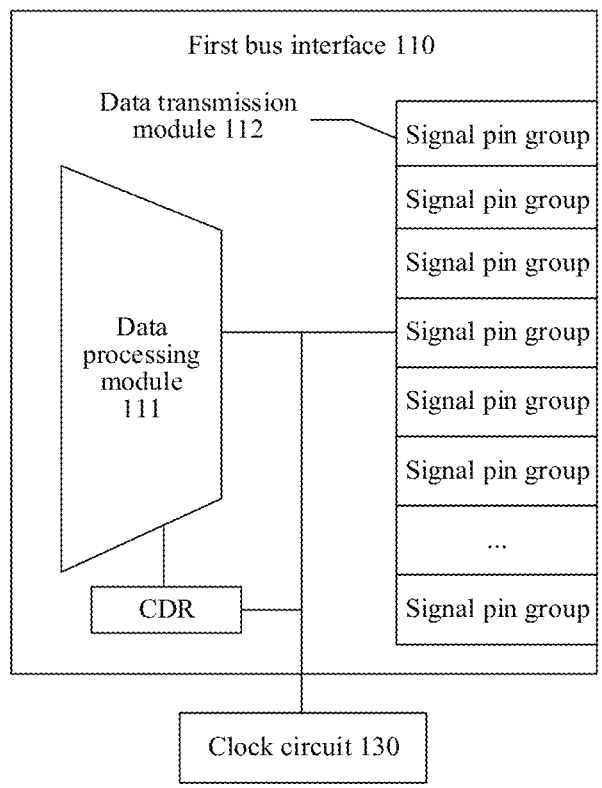
FIG. 8 is a schematic diagram of a connection between a first bus interface and a clock circuit according to this disclosure.

FIG. 8 shows a connection manner between the clock circuit 130 and the first bus interface 110 according to an embodiment of this disclosure. The clock circuit 130 may be connected to the clock pin in the data transmission module 112. In this way, the clock circuit 130 may transmit a clock signal to the clock pin. The clock circuit 130 may be further connected to the data processing module 111 through a frequency adjustment circuit. The frequency adjustment circuit can increase a clock signal frequency. In this way, a first clock signal may provide a clock signal with a high frequency for the data processing module 111 through the frequency adjustment circuit, and the data processing module 111 may implement modulation and demodulation by using the clock signal with the high frequency. A specific structure of the frequency adjustment circuit is not limited in embodiments of this disclosure. For example, the frequency adjustment circuit may be a clock recovery (clock and data recovery (CDR)) circuit, or may be another circuit. Any circuit that can improve the clock signal frequency may be used as the frequency adjustment circuit. In FIG. 8, the frequency adjustment circuit is a CDR circuit.

The following describes structures of the second bus interface 210 and the hierarchical memory controller 220 in the memory subsystem 200.

Figure 9:
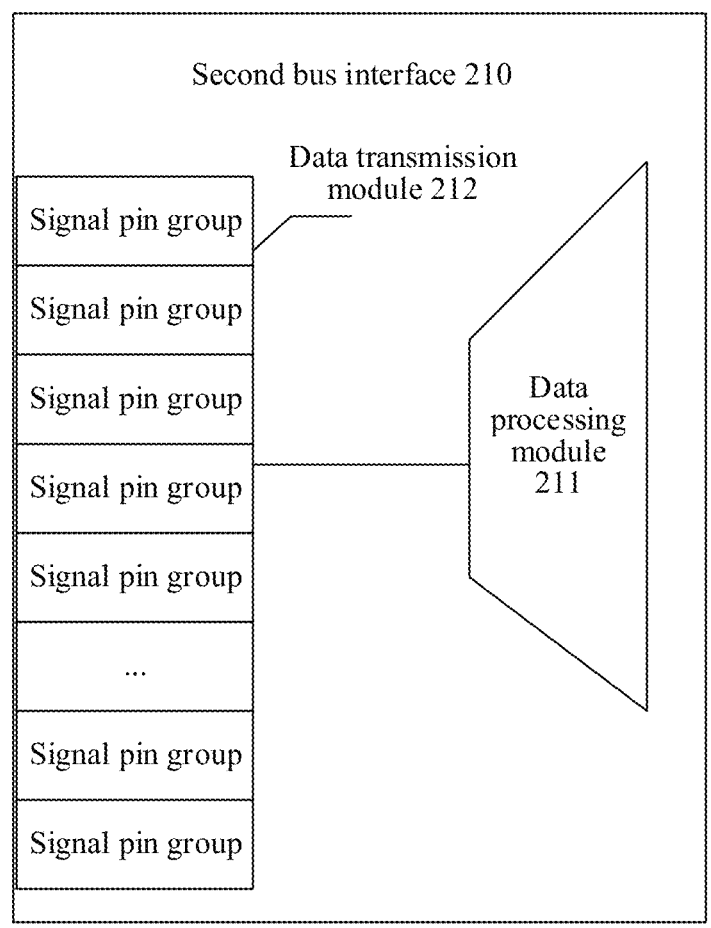
FIG. 9 is a schematic diagram of a structure of a second bus interface according to this disclosure.
Figure 10:
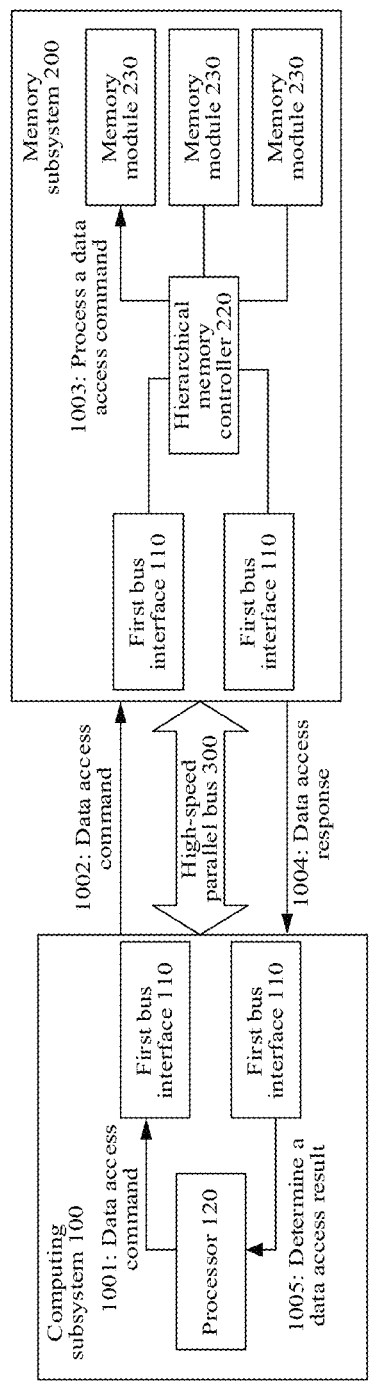
FIG. 10 is a schematic diagram of a data processing method according to this disclosure.

(4) Second bus interface 210:

FIG. 9 is a schematic diagram of a structure of the second bus interface 210 according to an embodiment of this disclosure. The second bus interface 210 includes a data processing module 211 and a data transmission module 212.

The data processing module 211 is connected to the hierarchical memory controller 220 (applicable to the data processing system shown in FIG. 2), or is directly connected to the memory module 230 (applicable to the data processing system shown in FIG. 1), and may receive a data access response sent by the hierarchical memory controller 220 (or the memory module 230). The data processing module 211 may process the data access response and generate a signal. The data transmission module 212 may transmit the signal generated by the data processing module 211 to the high-speed parallel bus 300. The data processing module 211 is connected to the data transmission module 212. The data transmission module 212 receives data from the high-speed parallel bus 300, and transmits a received data access command to the data processing module 211. The data processing module 211 may process the data access command received by the data transmission module 212, and transmit the processed data access command to the hierarchical memory controller 220 or the memory module 230.

The processing performed by the data processing module 211 on the data access command and the data access response includes modulation and demodulation. The data processing module 211 modulates data carried in the data access response, modulates the data onto a carrier signal, and generates a signal. For a data access response fed back for a data write request, the data access response may indicate that data writing succeeds or fails, and the data processing module 211 modulates the data access response and generates a control signal. For a data access response fed back for a data read command, data carried in the data access response includes a data address read from the memory subsystem 200. The data processing module 211 modulates data that needs to be read, and generates a data signal.

The control signal generated by the data processing module 211 may be understood as a control plane signal exchanged between the processor 120 and the memory subsystem 200. The data signal is a data plane signal exchanged between the processor 120 and the memory subsystem 200.

The data processing module 211 demodulates a signal transmitted by the data transmission module 212, to obtain data carried in the signal; and transmits the obtained data to the processor 120. The signal transmitted by the data transmission module 212 includes but is not limited to a data signal carrying data or a control signal sent by the computing subsystem 100. For example, when the computing subsystem 100 needs to read data in the memory subsystem 200, the control signal may indicate an address of the data that needs to be read from the memory subsystem 200. When the computing subsystem 100 writes data into the memory subsystem 200, the control signal may indicate an address of the data that needs to be written into the memory subsystem 200. The data signal may carry the data that needs to be written into the memory subsystem 200.

In embodiments of this disclosure, the data processing module 211 implements higher-order modulation and demodulation. For example, the data processing module 211 may implement modulation and demodulation by using PAM3 or PAM4.

That internal structures of the data processing module 211 and the data transmission module 212 are similar to internal structures of the data processing module 111 and the data transmission module 112 in the first bus interface 110 is not limited in embodiments of this disclosure. For details, refer to the foregoing descriptions. Details are not described herein again.

(5) Hierarchical memory controller 220:

A structure of the hierarchical memory controller 220 is not limited in embodiments of this disclosure. The hierarchical memory controller 220 may process a data access command, and read data from the memory module 230, or write data into the memory module 230. The hierarchical memory controller 220 may further feed back a data access response, to feed back the read data to the computing subsystem 100, or notify the memory subsystem 200 that the data writing succeeds or fails. The structure of the hierarchical memory controller 220 is not limited in embodiments of this disclosure. Any module that can process a data access command and feed back a data access response may be used as the hierarchical memory controller 220.

Based on the data processor 120 systems shown in FIG. 1 to FIG. 3, embodiments of this disclosure provide a data processing method. In the method, the computing subsystem 100 may send a data access command to the memory subsystem 200 via the first bus interface 110, and the memory subsystem 200 may further receive the data access command via the second bus interface 210, and process the data access command. The memory subsystem 200 may further send data to the computing subsystem 100 via the second bus interface 210, and the computing subsystem 100 may receive the data via the first bus interface 110. The method may include the following steps.

Step 1001: When the processor 120 needs to access data of the memory subsystem 200, the processor 120 generates a data access command.

Step 1002: The processor 120 sends the data access command to the memory subsystem 200 via the first bus interface 110.

The first bus interface 110 performs higher-order modulation on the data access command, and converts the data access command into a signal. For example, the first bus interface 110 may convert the data access command into a control signal (where for example, the data access command is a data read command), or convert the data access command into a control signal and a data signal (where for example, the data access command is a data write command). The first bus interface 110 transmits the converted signal to the high-speed parallel bus 300 through each pin of the first bus interface 110. The converted signal is transmitted to the memory subsystem 200 through the high-speed parallel bus 300.

Step 1003: The memory subsystem 200 receives the data access command via the second bus interface 210, processes the data access command, and accesses data in the memory module 230 according to the data access command.

When the memory subsystem 200 accesses the data in the memory module 230, if the data access command is a data read command, the memory subsystem 200 may read the data from the memory module 230, and use a data access response to carry the read data.

If the data access command is a data write command, the memory subsystem 200 may write data carried in the data access command into the memory module 230. If the writing succeeds, the memory subsystem 200 generates a data access response indicating that the data writing succeeds; or if the writing fails, the memory subsystem 200 generates a data access response indicating that the data writing fails.

Descriptions are provided herein by using an example in which the memory subsystem 200 includes the hierarchical memory controller 220. The second bus interface 210 receives a signal transmitted through the high-speed parallel bus 300, for example, receives a control signal (when the data access command is a data read command), or receives a control signal and a data signal (when the data access command is a data write command). The second bus interface 210 may perform higher-order demodulation on the received signal, to determine data carried in the signal. For a case in which the memory subsystem 200 does not include the hierarchical memory controller 220, the memory module 230 may process the data access command. In other words, in this case, the memory module 230 may have a function of the hierarchical memory controller 220.

If a control signal is received, that is, a data read command is received, where data carried in the control signal is an address, the hierarchical memory controller 220 may read data from the memory module 230 based on the address, and generate a data access response carrying the data. If a control signal and a data signal are received, that is, a data write command is received, where data carried in the control signal is an address, and to-be-written data is carried in the data signal, the hierarchical memory controller 220 may write the to-be-written data into the memory module 230 based on the address, and the hierarchical memory controller 220 may generate a data access response, where the data access response may indicate that the data writing succeeds or fails.

In embodiments of this disclosure, the data access response carrying the data, the data access response indicating that the data writing succeeds, and the data access response indicating that the data writing fails may all be used as data that can be sent by the memory subsystem 200 to the computing subsystem 100. For ease of description, in the following descriptions, the data access response refers to data that needs to be sent by the memory subsystem 200 to the computing subsystem 100.

Step 1004: The memory subsystem 200 sends the data access response to the computing subsystem 100 via the second bus interface 210.

The second bus interface 210 may perform higher-order modulation on the data access response before sending the data access response, and convert the data access response into a signal. For example, the second bus interface 210 may convert the data access response into a control signal (where for example, the data access response indicates that data writing succeeds or fails), or convert the data access response into a control signal and a data signal (where for example, the data access response carries data, the data signal carries data, and the control signal may carry control plane data). The first bus interface 110 transmits the converted signal to the high-speed parallel bus 300 through each pin of the first bus interface 110. The converted signal is transmitted to the computing subsystem 100 through the high-speed parallel bus 300.

Step 1005: The computing subsystem 100 receives the data access response via the first bus interface 110, and determines a data access result based on the data access response, for example, obtains the read data and determines whether the data is successfully written.

Inside the computing subsystem 100, the first bus interface 110 receives a signal transmitted through the high-speed parallel bus 300, for example, receives a control signal (where the data access response indicates that data writing succeeds or fails), or receives a control signal and a data signal (where the data access response carries data). The second bus interface 210 may perform higher-order demodulation on the received signal, to determine data carried in the signal. The processor 120 may obtain, from the second bus interface 210, the data carried in the signal, and determine a data access result.

The descriptions of the procedures corresponding to the accompanying drawings have respective focuses. For a part that is not described in detail in a procedure, refer to related descriptions of another procedure.

All or some of the foregoing embodiments may be implemented by using software, hardware, firmware, or any combination thereof. When software is used to implement the embodiments, all or some of the foregoing embodiments may be implemented in a form of a computer program product. The computer program product includes computer program instructions. When the computer program instructions are loaded and executed on a computer, all or some of the procedures or functions according to embodiments of the present disclosure are generated.

All or some of the foregoing embodiments may be implemented by software, hardware, firmware, or any combination thereof. When software is used to implement the embodiments, all or some of the foregoing embodiments may be implemented in a form of a computer program product. The computer program product includes one or more computer instructions. When the computer program instructions are loaded or executed on a computer, all or some of the procedures or the functions according to embodiments of this disclosure are generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), or a semiconductor medium. The semiconductor medium may be a solid-state drive (SSD).

It is clear that a person skilled in the art can make various modifications and variations to this disclosure without departing from the scope of this disclosure. This disclosure is intended to cover these modifications and variations provided that they fall within the scope of the claims of this disclosure and their equivalent technologies.

What is claimed is:

1. A system, comprising:
a high-speed parallel bus comprising:
  a first end; and
  a second end;
a computing subsystem comprising:
  a first bus interface connected to the first end; and
  a processor connected to the first end via the first bus interface and configured to:
    send, via the first bus interface, a data access command; and
    receive, via the first bus interface, data, wherein the first bus interface is configured to:
      modulate, through higher-order modulation, the data access command; and
      demodulate, through the higher-order modulation, the data; and
a memory subsystem comprising:
  a second bus interface connected to the second end; and
  a memory component connected to the second bus interface, comprising the data, and configured to:
    receive, via the second bus interface and from the computing subsystem, the data access command;
    access, according to the data access command, the data; and
    send, via the second bus interface and to the computing subsystem, the data,
  wherein the second bus interface is configured to:
    demodulate, through the higher-order modulation, the data access command; and
    modulate, through the higher-order modulation, the data.

2. The system of claim 1, wherein the memory component comprises a plurality of types of memory components, wherein the memory subsystem further comprises a plurality of hierarchical memory controllers, and wherein one of the plurality of hierarchical memory controllers is connected to one of the plurality of types of memory components, connected, via the second bus interface, to the high-speed parallel bus, and configured to either:
receive, via the second bus interface, the data access command; or
send, via the second bus interface, the data.

3. The system of claim 1, wherein the first bus interface comprises a plurality of signal pin groups, wherein a ratio of a first quantity of pins for ground signal transmission to a second quantity of pins for data transmission in each of the plurality of signal pin groups is greater than 1 and less than 2, and wherein the data comprises a data signal, a control signal, and a clock signal.

4. The system of claim 3, wherein the ratio is 5:3.

5. The system of claim 3, wherein pins in each of the plurality of signal pin groups are arranged in an array comprising rows, and wherein pins in adjacent rows are not aligned.

6. The system of claim 3, wherein each of the plurality of signal pin groups comprises 32 pins.

7. The system of claim 3, wherein each of the plurality of signal pin groups comprises eight pins for data signal transmission, two pins for control signal transmission, two pins for clock signal transmission, and twenty pins for the ground signal transmission.

8. The system of claim 3, wherein the plurality of signal pin groups comprises eight signal pin groups.

9. The system of claim 3, wherein pins in each of the plurality of signal pin groups are arranged in an array comprising rows, wherein pins in a plurality of spaced rows are aligned, and wherein the spaced rows are spaced at an interval of one row from each other in the array.

10. The system of claim 3, wherein pins in each of the plurality of signal pin groups are arranged in an array comprising rows, and wherein a perpendicular line from any pin in one of the rows to an adjacent row coincides with a mid-perpendicular line of two adjacent pins in the adjacent row.

11. The system of claim 3, wherein pins in each of the plurality of signal pin groups are arranged in an array comprising rows, wherein any pin in one of the rows and two adjacent pins form an equilateral triangle, and wherein the two adjacent pins are located in a same row.

12. The system of claim 1, wherein the computing subsystem further comprises a clock circuit configured to provide a first clock signal for the first bus interface, wherein the clock circuit comprises an inductor and a signal source, and wherein the inductor and the signal source are in a T-shaped structure.

13. The system of claim 12, further comprising a frequency adjustment circuit, wherein the clock circuit is connected, through the frequency adjustment circuit, to the first bus interface, wherein the frequency adjustment circuit is configured to increase a frequency of the first clock signal to produce a second clock signal, and wherein the first bus interface is further configured to perform, based on the second clock signal, the higher-order modulation.

14. A method, comprising:
modulating, by a first bus interface of a computing subsystem and through higher-order modulation, a data access command to produce a modulated data access command;
sending, by a processor of the computing subsystem, via the first bus interface, and to a memory subsystem, the modulated data access command;
receiving, by a second bus interface of the memory subsystem, the modulated data access command;
demodulating, by the second bus interface and through the higher-order modulation, the modulated data access command to produce the data access command; and
accessing, by a memory component of the memory subsystem and according to the data access command, data in the memory component.

15. The method of claim 14, further comprising:
modulating, by the second bus interface and through the higher-order modulation, the data to produce modulated data;
sending, by the memory component, via the second bus interface, and to the computing subsystem, the modulated data;
receiving, by the processor and via the first bus interface, the modulated data; and
demodulating, by the first bus interface and through the higher-order modulation, the modulated data to produce the data.

16. The method of claim 14, wherein receiving the modulated data access command comprises receiving, by one of a plurality of hierarchical memory controllers of the memory subsystem and via the second bus interface, the modulated data access command.

17. The method of claim 15, wherein sending the modulated data comprises sending, by one of a plurality of hierarchical memory controllers of the memory subsystem and via the second bus interface, the modulated data.

18. A computer program product comprising instructions that are stored on a non-transitory computer-readable storage medium and that, when executed by a first processor, cause an apparatus to:
modulate, by a first bus interface of a computing subsystem and through higher-order modulation, a data access command to produce a modulated data access command;
send, by a second processor of the computing subsystem, via the first bus interface, and to a memory subsystem, the modulated data access command;
receive, by a second bus interface of the memory subsystem, the modulated data access command;
demodulate, by the second bus interface and through the higher-order modulation, the modulated data access command to produce the data access command; and
access, by a memory component of the memory subsystem and according to the data access command, data in the memory component.

19. The computer program product of claim 18, wherein the first processor is further configured to execute the instructions to:
modulate, by the second bus interface and through the higher-order modulation, the data to produce modulated data;
send, by the memory component, via the second bus interface, and to the computing subsystem, the modulated data;
receive, by the second processor and via the first bus interface, the modulated data; and
demodulate, by the first bus interface and through the higher-order modulation, the modulated data to produce the data.

20. The computer program product of claim 18, wherein the first processor is further configured to execute the instructions to receive, by one of a plurality of hierarchical memory controllers of the memory subsystem and via the second bus interface, the modulated data access command.

* * * * *